United States Patent Office 3,475,371
Patented Oct. 28, 1969

---

3,475,371
POLYESTERS STABILIZED WITH ALIPHATIC ORTHOSILICATES
Mary J. Stewart, Riddlewood, Media, and Otto K. Carlson, Marcus Hook, Pa., assignors to FMC Corporation, Philadelphia, Pa., a corporation of Delaware
No Drawing. Filed Mar. 25, 1968, Ser. No. 715,587
Int. Cl. C08g 51/58
U.S. Cl. 260—45.7                                    8 Claims

---

ABSTRACT OF THE DISCLOSURE

A thermal stabilized polyester comprising a highly polymeric linear polyester and a thermal stabilizer selected from the group consisting of lower alkyl and lower alkenyl esters of orthosilicic acid.

---

This invention relates to highly polymeric linear polyester resins that possess improved thermal stability and to a method of producing same.

The fiber and film-forming linear polyester resins used in the present invention can be prepared by first carrying out a condensation reaction between a suitable aromatic dicarboxylic acid or ester thereof which does not contain any ethylenic unsaturation and a diol to form a prepolymer. The resulting prepolymer is then polycondensed to form the desired polyester resin. When an ester of a dicarboxylic acid is used as the starting material, it is first reacted with a diol in the presence of a transesterification or ester-interchange catalyst by means of an ester-interchange reaction; whereas when a dicarboxylic acid is used as the starting material, it is first subjected to a direct esterification reaction with a diol in the presence of what is generally called a first stage additive or ether inhibitor. In either instance, the resulting reaction product, which may be generally described as a polyester prepolymer, is then polycondensed in the presence of a polycondensation catalyst to form a polyester resin.

For example, in the case of the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Linear polyester resins, such as polyethylene terephthalate and others, are widely used in the production of films and fibers and the like. However, it is generally known that such polyester products degrade when exposed to heat for a substantial period of time. Such degradation is particularly a problem in the extrusion and spinning processes of the finished resins to form the above-denoted products. Additionally, the fibers produced from such resins are extensively used in the textile field and, as a result of this application, are subjected to rather extreme temperatures in the processes of washing, drying, and ironing. Therefore, it is highly desirable that the polyester resin composition possess as much stability at high temperatures as possible.

Therefore, it is an object of the present invention to prepare a highly polymeric linear polyester resin composition which exhibits improved thermal stability.

Another object of the present invention is to provide a method of preparing linear polyester resin exhibiting such a high degree of thermal stability.

These and other objects are accomplished in accordance with the present invention with a stabilized polyester composition comprising a highly polymeric linear polyester containing a stabilizing amount of a thermal stabilizer selected from the group consisting of lower alkyl and lower alkenyl esters of orthosilicic acid. The terms "lower alkyl" and "lower alkenyl" used above and hereinafter, refer to radicals containing from 1 to 6 carbon atoms.

The silicate compounds used as thermal stabilizers in the polyester compositions of the present invention can be represented by the general formula $(R)_4SiO_4$, wherein R is a lower alkenyl or lower alkyl radical.

Among the esters of orthosilicic acid or silicates which can be used as thermal stabilizers in accordance with the present invention are, for example, tetraethyl-orthosilicate, tetrapropyl-orthosilicate, tetraamyl-orthosilicate, tetraamyl-orthosilicate, tetraallyl-orthosilicate, and tetra-2-pentenyl-orthosilicate.

The highly polymeric linear polyester resins used in the preparation of the subject thermal stabilized polyester compositions can be prepared via either the conventional ester-interchange reaction or direct esterification method, both of which are thoroughly disclosed throughout the prior art.

In the practice of the present invention, it has been found that it is preferred to mix or blend the present thermal stabilizers in the polyester resin immediately after the polycondensation step has been completed, at atmospheric pressure, while the resin is still molten.

It has been found that the present thermal stabilizers, as defined above, are effective as such in polyester resin compositions when employed in amounts ranging from about 0.01% to about 0.5%, by weight, based on the weight of the linear polyester resin. Usually, it has been found that concentrations ranging from about 0.02% to about 0.3%, by weight, are preferred in most instances. However, when indicated, concentrations less or greater than the above can be used, but their effectiveness is generally reduced proportionally.

The following examples will further serve to illustrate the present invention, although it will be understood that these examples are included merely for the purpose of illustration and are not intended to limit the scope of the present invention. All parts are by weight, unless otherwise indicated.

EXAMPLE I

A blended mixture comprising 474 g. of terephthalic acid, 288 mls. of ethylene glycol and 149 mls. of triethylamine was charged into a reaction vessel equipped with a nitrogen inlet, a Dean-Starke separating apparatus, heating means and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 230° C. over a one-hour period to remove all the triethylamine and any excess glycol. The prepolymer product was allowed to cool under an atmosphere of nitrogen.

EXAMPLE II

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the polyester prepolymer and formation of a polyester resin. The polyethylene terephthalate resin formed had an original intrinsic viscosity of 0.88, a degraded intrinsic viscosity of 0.69, and the percentage broken bonds was calculated as 0.132.

EXAMPLE III

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. After the polycondensation reaction had been completed, 0.02 ml. of tetraamyl-orthosilicate was thoroughly stirred into the polyester resin while still molten at atmospheric pressure, after which the resin product was cooled. The resulting polyethylene terephthalate composition had an original intrinsic viscosity of 0.71, a degraded intrinsic viscosity of 0.65, and the percentage broken bonds was calculated as 0.054.

EXAMPLE IV

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the poly-condensation of the prepolymer and formation of a polyester resin. After the polycondensation reaction had been completed, 0.02 ml. of tetraallyl-orthosilicate was thoroughly stirred into the polyester resin while still molten at atmospheric pressure, after which the resin product was cooled. The resulting polyethylene terephthalate composition had an original intrinsic viscosity of 0.65, a degraded intrinsic viscosity of 0.58, and the percentage broken bonds was calculated as 0.086.

In the above examples, the original intrinsic viscosity values of the polyester resin products were obtained by measuring the intrinsic viscosities of the resin compositions as produced.

The degraded intrinsic viscosity values were determined by the following procedure: The polyester resin composition was grounded and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. ($\pm 0.5°$ C.). The block was then sealed and evacuated to 0.1 mm. of mercury. After holding for about 10–15 seconds, the block was filled with dried, oxygen-free nitrogen gas. This vacuum-nitrogen purge was then repeated for a total of three times; the entire process took 5–7 minutes. Then the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted in the examples above as the degraded intrinsic viscosity.

The percentage broken bonds values indicated in the above examples were calculated by the use of the following equation:

$$\% \text{ Broken Bonds} = \left[\left(\frac{K}{V_f}\right)^{1/a} - \left(\frac{K}{V_i}\right)^{1/a}\right] \times 9.6 \times 10^3$$

the value of K and $a$ may be found in the literature, such as Conix, A., Makromol., Chemie 26, p. 226 (1958), wherein K=0.00021 and $a$=0.82. $V_f$ in the above formula is the degraded or final intrinsic viscosity value, and $V_i$ is the original or initial intrinsic viscosity value.

All of the intrinsic viscosity determinations of the polyester resin products produced in the above examples were determined in a 60% phenol-40% tetrachloroethane solution, wt./wt., at 30° C., according to conventional laboratory procedure.

The results in the above examples indicate that the present additives, when added to linear polyester resins, act to stabilize or reduce the degradation effects of higher temperatures upon such polyester resins. The change in intrinsic viscosity or the difference between the original intrinsic viscosity and the degraded intrinsic viscosity is a direct measure of the heat stabilizing effect that the present thermal stabilizers have upon polyester resins and can be readily calculated from the above results.

When the control above, Example II, is compared with the corresponding Examples wherein the same catalysts systems and starting materials were used, but with the addition of a thermal stabilizer of the present invention, it can readily be seen from the intrinsic viscosity values and the percentage broken bonds values that the present stabilizers act to limit the amount of degradation that takes place when polyester resin products are exposed to elevated temperatures for prolonged periods of time.

The present invention has been illustrated with particular respect to the stabilization of polyethylene terephthalate. However, the present thermal stabilizers are also effective in stabilizing any fibers and film-forming linear polyesters and copolyesters; for example, those derived from aromatic dicarboxylic acids, such as isophthalic acid, and 4,4'-diphenyldicarboxylic acid, or ester derivatives thereof, and suitable diols, such as glycols of the series HO($CH_2$)$_n$OH, where $n$ is 2 to 10.

It will be apparent that various different embodiments can be made practicing this invention without departing from the spirit and scope thereof, and therefore, it is not intended to be limited, except as indicated in the appended claims.

We claim:
1. A stabilized polyester composition comprising a linear saturated polyester containing a stabilizing amount of a compound selected from the group consisting of lower alkyl and lower alkenyl esters of orthosilicic acid.
2. The composition of claim 1 wherein the polyester is polyethylene terephthalate.
3. The composition of claim 1 containing from about 0.01% to about 0.5%, by weight, of a thermal stabilizer, based on the weight of the linear polyester.
4. The composition of claim 1 wherein the compound is tetraethyl-orthosilicate.
5. The composition of claim 1 wherein the compound is tetrapropyl-orthosilicate.
6. The composition of claim 1 wherein the compound is tetraamyl-orthosilicate.
7. The composition of claim 1 wherein the compound is tetraallyl-orthosilicate.
8. The composition of claim 1 wherein the compound is tetra-2-pentenyl-orthosilicate.

References Cited

UNITED STATES PATENTS

| | | | |
|---|---|---|---|
| 2,789,100 | 4/1957 | Wilson | 260—31.8 |
| 3,174,945 | 3/1965 | Taylor et al. | 260—40 |
| 3,346,542 | 10/1967 | Koepp et al. | 260—75 |

DONALD E. CZAJA, Primary Examiner

R. A. WHITE, Assistant Examiner

PO-1050
(5/69)

UNITED STATES PATENT OFFICE
CERTIFICATE OF CORRECTION

Patent No. 3,475,371　　　　Dated October 28, 1969

Inventor(s) Mary J. Stewart and Otto K. Carlson

It is certified that error appears in the above-identified patent and that said Letters Patent are hereby corrected as shown below:

Column 2, lines 12 and 13, cancel "tetra-amyl-orthosilicate," (second occurrence). Column 3, line 43, change "grounded" to --ground--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents